(12) United States Patent
Lawson et al.

(10) Patent No.: US 7,510,140 B2
(45) Date of Patent: Mar. 31, 2009

(54) METHOD AND APPARATUS FOR GENERATING LIFT

(75) Inventors: Edward L. Lawson, Long Beach, CA (US); David A. Boyer, Redondo Beach, CA (US)

(73) Assignee: The Boeing Company, Chicago, IL (US)

(*) Notice: Subject to any disclaimer, the term of this patent is extended or adjusted under 35 U.S.C. 154(b) by 477 days.

(21) Appl. No.: 11/224,404

(22) Filed: Sep. 12, 2005

(65) Prior Publication Data

US 2007/0252032 A1    Nov. 1, 2007

(51) Int. Cl.
*B64C 29/00*    (2006.01)
(52) U.S. Cl. ............... 244/12.5; 60/226.3; 244/12.4
(58) Field of Classification Search ....... 244/12.3–12.5; 60/226.1, 228, 226.3, 262
See application file for complete search history.

(56) References Cited

U.S. PATENT DOCUMENTS

| | | | | |
|---|---|---|---|---|
| 2,912,188 A * | 11/1959 | Singelmann et al. | ....... | 244/12.5 |
| 2,940,689 A * | 6/1960 | Howell | ....... | 244/12.3 |
| 3,263,416 A * | 8/1966 | Bill et al. | ....... | 60/226.1 |
| 3,318,097 A * | 5/1967 | Wood et al. | ....... | 60/262 |
| 3,499,620 A * | 3/1970 | Sturm et al. | ....... | 244/55 |
| 3,972,490 A * | 8/1976 | Zimmermann et al. | ....... | 244/12.3 |
| 4,222,233 A * | 9/1980 | Johnson et al. | ....... | 60/225 |
| 4,447,028 A * | 5/1984 | Wang | ....... | 244/212 |
| 6,662,546 B1 * | 12/2003 | Giffin, III | ....... | 60/39.5 |
| 6,729,575 B2 * | 5/2004 | Bevilaqua | ....... | 244/12.3 |

\* cited by examiner

*Primary Examiner*—Tien Dinh

(57) ABSTRACT

A method of generating lift for a vehicle including a gas turbine engine having a combustor, a core flow heated by the combustor, and a bypass flow which bypasses the combustor. The method includes segregating at least a portion of the core flow from the bypass flow, directing the segregated portion of the core flow in a first direction to generate lift for the vehicle, segregating at least a portion of the bypass flow from the core flow, and directing the segregated a portion of the bypass flow in a second direction to generate lift for the vehicle.

17 Claims, 2 Drawing Sheets

METHOD AND APPARATUS FOR GENERATING LIFT

BACKGROUND OF THE INVENTION

The present invention relates generally to vehicles, and more specifically to a method and apparatus for generating lift for a vehicle.

Vertical take-off and landing (VTOL) technology often uses diverted exhaust gases from a gas turbine engine to distribute lift along an aircraft. VTOL is typically used with engines that do not generate a bypass air flow or that operate with a generally low bypass ratio because of the higher-energy exhaust gases they produce However, such higher-energy engines often have a lower fuel efficiency than engines having a greater bypass ratio. Accordingly, some aircraft having VTOL suffer from a high specific fuel consumption during cruise portions of flight. Additionally, some known VTOL systems use a lift fan driven by a shaft coupled to a turbine within the engine. The turbine and shaft may disrupt the exhaust flowfield within the engine and thereby reduce the fuel efficiency of the engine, especially during cruise portions of a flight. Furthermore, the gas exiting some known VTOL systems to generate lift may have a temperature greater than about 800° F. Such high temperatures may cause damage to surfaces from which the aircraft takeoffs and on which the aircraft lands, such as runways, aircraft carrier decks, and/or natural terrain. For example, temperatures above about 800° F. may cause brush fires when an aircraft takes off from and/or lands on natural terrain.

SUMMARY OF THE INVENTION

In one aspect, a method is provided for generating lift for a vehicle including a gas turbine engine having a combustor, a core flow heated by the combustor, and a bypass flow which bypasses the combustor. The method includes segregating at least a portion of the core flow from the bypass flow, directing the segregated portion of the core flow in a first direction to generate lift for the vehicle, segregating at least a portion of the bypass flow from the core flow, and directing the segregated a portion of the bypass flow in a second direction to generate lift for the vehicle.

In another aspect, the present invention includes a vehicle comprising a frame having an engine compartment for mounting a gas turbine engine having a combustor, a core flow heated by the combustor, and a bypass flow which bypasses the combustor. The vehicle also includes a core duct mounted on the frame and aligned with the engine compartment to receive core flow from the engine. An end of the core duct downstream from the engine compartment is positioned with respect to the frame to direct the core flow received from the engine in a first direction to drive a lift fan without mixing the core flow received from the engine with bypass flow. The vehicle also includes a bypass duct mounted on the frame and aligned with the engine compartment to receive bypass flow from the engine. An end of the bypass duct downstream from the engine compartment is positioned with respect to the frame to direct the bypass flow received from the engine in a second direction to generate lift for the vehicle without mixing the bypass flow with core flow.

In another aspect, the present invention includes an aircraft comprising an airframe, and a gas turbine engine mounted on the airframe including a combustor, wherein the gas turbine engine generates a core flow flowing through the combustor and a bypass flow bypassing the combustor. The aircraft also includes a core duct mounted on the airframe to receive core flow from the engine. An end of the core duct downstream from the engine is positioned with respect to the airframe to direct the core flow received from the engine in a first direction to generate lift for the vehicle without mixing the core flow received from the engine with bypass flow. The aircraft also includes a bypass duct mounted on the airframe to receive bypass flow from the engine. An end of the bypass duct downstream from the engine is positioned with respect to the airframe to direct the bypass flow received from the engine in a second direction to generate lift for the vehicle without mixing the bypass flow received from the engine with core flow.

In yet another aspect, the present invention includes an aircraft comprising an airframe, and a gas turbine engine mounted on the airframe including a combustor. The gas turbine engine generates a core flow directed through the combustor and a bypass flow bypassing the combustor, wherein the engine has a bypass ratio of at least about four to one. The aircraft also includes a lift system having at least one duct mounted on the airframe and fluidically connected to the engine to receive at least one of core flow and bypass flow from the engine. An end of the duct downstream from the engine is positioned with respect to the airframe to direct the flow received from the engine in a first direction to generate lift for the vehicle.

In even another aspect, the present invention includes an aircraft comprising an airframe, and a gas turbine engine mounted on the airframe including a combustor, wherein the gas turbine engine generates a core flow directed through the combustor and a bypass flow bypassing the combustor. The aircraft also includes a core duct mounted on the airframe to receive core flow from the engine. An end of the core duct downstream from the engine is positioned with respect to the airframe to direct the core flow received from the engine in a first direction to drive a lift fan, wherein gas exiting the lift fan has a temperature of less than about 800° F. The aircraft also includes a bypass duct mounted on the airframe to receive bypass flow from the engine. An end of the bypass duct downstream from the engine is positioned with respect to the airframe to direct the bypass flow received from the engine in a second direction to generate lift for the vehicle, wherein the bypass flow directed in the second direction exits the bypass duct at a temperature of less than about 800° F.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
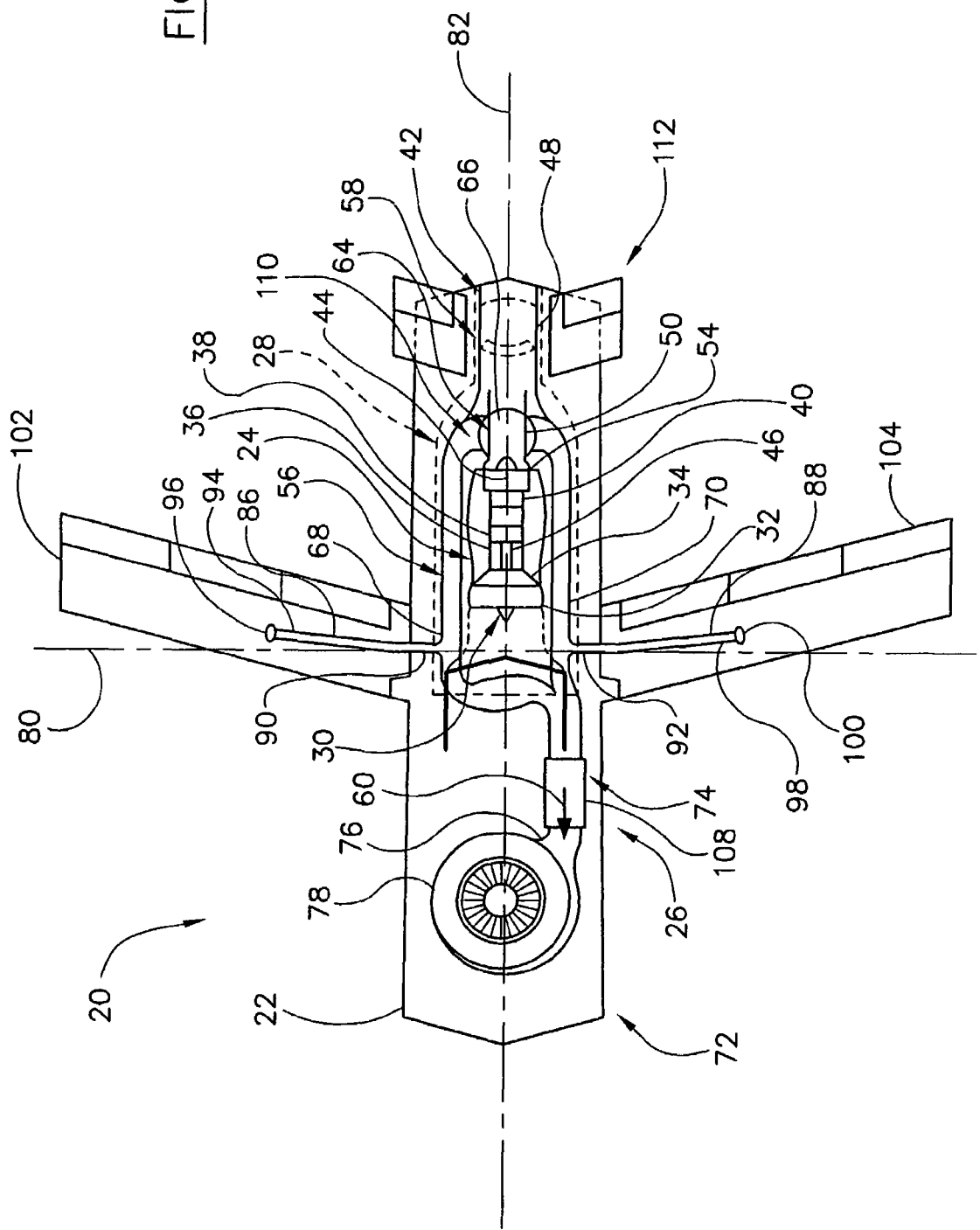
FIG. 1 is a schematic top plan of an aircraft having one embodiment of a lift system of the present invention.

Referring now to the drawings, and more specifically to FIG. 1, an aircraft is designated in its entirety by the reference numeral 20. The aircraft 20 includes an airframe 22, a gas turbine engine (generally designated by 24), and a lift system (generally designated by 26) of the present invention. The gas turbine engine 24 is mounted on the airframe 22 within an engine compartment (generally designated by 28) of the airframe to propel the aircraft 20 during flight. The gas turbine engine 24 includes an open inlet (generally designated by 30), a fan 32, a compressor 34, a combustor 36, a high pressure turbine 38, a low pressure turbine 40, and an exhaust 42. The fan 32 and the low pressure turbine 40 are coupled by a first shaft 44 so the low pressure turbine drives the fan, and the compressor 34 and the high pressure turbine 38 are coupled by a second shaft 46 so the high pressure turbine drives the compressor. In one embodiment, the exhaust 42 includes a nozzle 48. Although any suitable gas turbine engine may be used without departing from the scope of the present invention, in one embodiment the gas turbine engine 24 is a CF34-8C engine available from General Electric Company of Evendale, Ohio.

In operation, air entering the inlet 30 is moved downstream through the engine 24 by the fan 32. A portion of the air moved by the fan 32 is channeled into the compressor 34 wherein it is compressed. The compressed air from the compressor 34 is channeled to the combustor 36, wherein it is heated by mixing the air with a fuel and igniting the mixture to produce a flow of hot combustion gases. The portion of the air channeled into and heated by the combustor 36 will be referred to herein as "core flow." The core flow is channeled from the combustor 36 to drive the high pressure turbine 38 and the low pressure turbine 40, which drive the compressor 34 and the fan 32, respectively. The core flow exits the engine 24 downstream from the low pressure turbine 40 through a core outlet 50. A portion of the air moved by the fan 32 is also channeled to bypass the combustor 36. The portion of air bypassing the combustor 36 will be referred to herein as "bypass flow." The bypass flow is channeled into the exhaust 42 of the engine 24 through a bypass outlet 54. As shown in FIG. 1, the bypass outlet 54 and the core outlet 50 terminate within the exhaust 42 upstream from the nozzle 48, such that the bypass flow and core flow mix within the exhaust of the engine after exiting the bypass and core exhausts, respectively. However, the bypass outlet 54 and the core outlet 50 may be segregated along generally the entire length of the exhaust 42 without departing from the scope of the present invention, such that the bypass flow and core flow do not mix within the exhaust. The mixture of bypass and core flow, or alternatively the separate bypass and core flows, exit the exhaust 42 of the engine 24 to generate thrust for the aircraft 20. The ratio of bypass flow to core flow flowing through the engine 24 is referred to herein as a "bypass ratio." Although gas turbine engines having other bypass ratios may be used without departing from the scope of the present invention, in one embodiment the gas turbine engine 24 has a bypass ratio of at least about four to about one.

The lift system 26 of the present invention includes a core duct (generally designated by 56) and a bypass duct (generally designated by 58). The core duct 56 is mounted on the airframe 22 and aligned with the engine compartment 28 and the engine 24 to receive core flow from the engine. The bypass duct 58 is mounted on the airframe 22 and aligned with the engine compartment 28 and the engine 24 to receive bypass flow from the engine 24. Generally, the core duct 56 segregates at least a portion of the core flow exiting the core outlet 50 from the bypass flow and directs the segregated portion of the core flow in a direction (e.g., direction 60) generating lift for the aircraft 20 (either directly or indirectly, as will be described below). Similarly, the bypass duct 58 segregates at least a portion of the bypass flow exiting the bypass outlet 54 from the core flow and directs the segregated portion of the bypass flow in a direction generating lift for the aircraft 20 (e.g., direction 62 shown in FIG. 2).

Although the core duct 56 may be aligned with the engine compartment 28 and the engine 24 in any suitable fashion to receive core flow from the engine, in one embodiment the core duct 56 is aligned with the engine compartment 28 and the engine 24 as shown in FIG. 1. Specifically, an upstream end (generally designated by 64) of the core duct 56 is positioned downstream from the core outlet 50 to receive core flow from the core outlet. A diverter 66 is fluidically connected to the core duct 56 and the core outlet 50, and is positioned with respect to the engine compartment 28 (between the engine 24 and the core duct) to direct core flow from the engine to the core duct. The arrangement shown in FIG. 1 allows the core duct 56 to receive core flow from the engine 24 without mixing the received core flow with bypass flow. The diverter 66 is selectable between an open position wherein the diverter allows generally all of the core flow exiting the core outlet 50 to flow past the diverter into the exhaust 42 of the engine 24 (thereby bypassing the core duct 56), and a closed position wherein the diverter diverts generally all of the core flow exiting the core outlet into the core duct. In one embodiment, the diverter 66 is selectable to a position wherein the diverter directs a portion of the core flow into the core duct 56 and allows a portion of the core flow to flow past the diverter into the exhaust 42 of the engine 24.

Although the diverter 66 is shown in FIG. 1 as being positioned downstream from the core outlet 50, the diverter and/or the upstream end 64 of the duct 56 may be positioned at least partially within the core outlet without departing from the scope of the present invention. Although other diverters may be used without departing from the scope of the present invention, in one embodiment the diverter 66 is a conventional clamshell diverter.

Although the core duct 56 may be positioned with respect to the airframe 22 in any suitable fashion to direct core flow received the engine 24 in a direction generating lift for the aircraft 20, in one embodiment the core duct 56 is positioned with respect to the airframe as shown in FIG. 1. Specifically, the core duct 56 extends from the upstream end 64 along two branches 68, 70 toward a forward end (generally designated by 72) of the aircraft 20. The two branches 68, 70 merge into a downstream end (generally designated by 74) of the core duct 56. In the exemplary embodiment shown in FIG. 1, the downstream end 74 of the core duct 56 is positioned with respect to the airframe 22 to direct the core flow in the direction 60, which is aligned with an inlet 76 of a lift fan 78 mounted on the airframe 22. The core flow supplied to the lift fan 78 by the core duct 56 drives the lift fan 78 to move air in a direction (e.g., direction 79 shown in FIG. 2) generating lift for the aircraft 20. The lift fan 78 may draw air to move in a direction generating lift from air adjacent the aircraft 20 or from a supply of air on-board the aircraft 20. Because the core duct 56 receives core flow from the engine 24 without mixing the received core flow with bypass flow, the core flow supplied to the lift fan 78 (and/or the core flow directed in a direction directly generating lift, as described below) is segregated from bypass flow.

Figure 2:
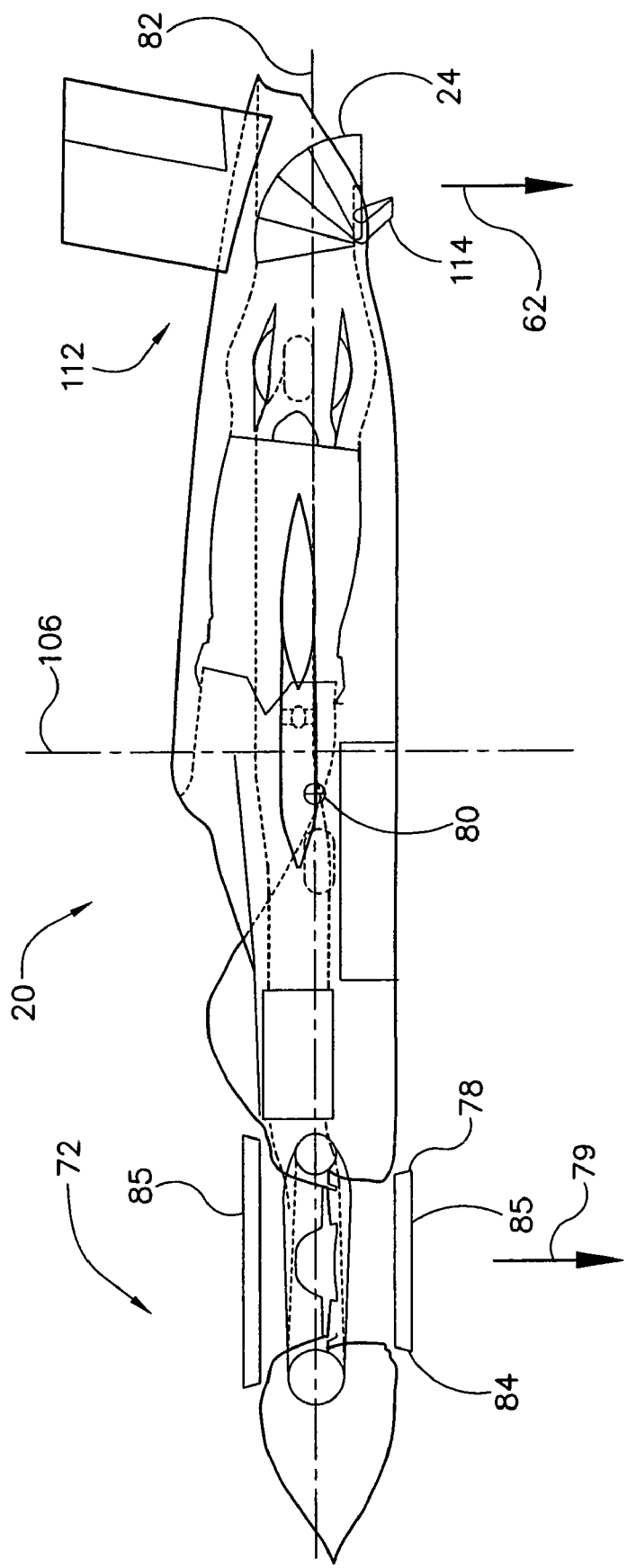
FIG. 2 is a side elevation of the aircraft shown in FIG. 1.

Although the lift fan 78 is shown in FIGS. 1 and 2 mounted on the airframe 22 adjacent the forward end 72 of the aircraft 20, the lift fan 78 may be mounted anywhere on the airframe without departing from the scope of the present invention. Similarly, although the lift fan 78 is shown in FIG. 2 as moving air in the direction 79 extending generally perpendicular to a pitch axis 80 and a roll axis 82 of the aircraft 20, the lift fan 78 may move air in any direction generating lift for the aircraft without departing from the scope of the present invention. The core duct 56 (FIG. 1) may direct the core flow received from the engine 24 in any general direction (e.g., direction 60 shown in FIG. 1) supplying the lift fan 78 without departing from the scope of the present invention. By driving the lift fan 78, the core duct 56 directs core flow in a direction (aligned with the inlet 76 shown in FIG. 1) that indirectly generates lift for the aircraft 20. However, in alternative or in addition to the lift fan 78, the core duct 56 may direct core flow in a direction (e.g., direction 79) that directly generates lift for the aircraft 20 without departing from the scope of the present invention. Any direction the core duct 56 directs core flow and any direction the lift fan 78 moves air may be referred to herein as a first, a second, and/or a third direction. In this embodiment, the CF34-8C has an installed thrust of about 14,000 lbf (at sea level static). At this rated condition, the engine core is generating about 3300 lbf of thrust with remaining thrust coming from the engine bypass flow (i.e., fan thrust). The combination of core flow and augmentor energy boost would be sufficient to drive a lift fan capable of generating about 8500 lbf of thrust.

Although other temperatures are within the scope of the present invention, in one embodiment the air moved by the lift fan 78 to generate lift for the aircraft 20 exits an outlet 84 of the lift fan 78 at a temperature of between about 200° F. and about 350° F. Other systems using core flow or a mixture of core and bypass flow to directly generate lift typically have flow exiting the system at temperatures greater than about 800° F. Such high temperatures can cause damage to many surfaces the aircraft 20 takes off from and/or lands on, such as runways, aircraft carrier decks, and/or natural terrain. For example, temperatures above about 450° F. may cause brush fires when the aircraft 20 takes off from and/or lands on natural terrain. By using a lift fan 78 that moves ambient air instead of directly generating lift using core flow or a mixture of core and bypass flow, the present invention reduces a temperature at which gas is directed at a surface for takeoff and/or landing of the aircraft 20. Accordingly, use of the lift fan 78 of the present invention may facilitate reducing damage to surfaces the aircraft 20 takes off from and/or lands on. Additionally, use of the lift fan 78 may also allow the aircraft 20 to take off from and/or land on surfaces, and/or operate in environments, not possible with higher temperatures.

Although other lift fans may be used without departing from the scope of the present invention, in one embodiment the lift fan 78 is tip-turbine lift fan such as those previously available from General Electric Company. In this embodiment, the lift fan 78 includes both top and bottom mounted louvers 85, which can be used for closing off the fan or for thrust vectoring purposes. In an alternative embodiment, the lift fan 78 is not driven by core flow supplied by the core duct 56, but is instead driven by a shaft (not shown) coupled to a turbine (not shown) within the engine 24 which is driven by core flow within the core. However, such a shaft-driven arrangement may reduce fuel efficiency of the engine 24 because the turbine and shaft may disrupt an exhaust flowfield within the engine. By driving the lift fan 78 with core flow from the engine 24, the present invention may not disrupt the exhaust flowfield within the engine and thereby may facilitate providing a more fuel efficient engine than systems having a shaft-driven lift fan.

As shown in FIG. 1, in one embodiment the lift system 26 includes two attitude control ducts 86, 88 mounted on the airframe 22 and aligned with the engine compartment 28 and the engine 24 to receive core flow from the engine. Although the attitude control ducts 86, 88 may be aligned with the engine compartment 28 and the engine 24 in any suitable fashion to receive core flow from the engine, in one embodiment the control ducts 86, 88 are aligned with the engine compartment and the engine as shown in FIG. 1. Specifically, an upstream end 90 of the control duct 86 is fluidically connected to the core duct branch 68 downstream from the core outlet 50 to receive core flow from the core duct 56. Similarly, an upstream end 92 of the control duct 88 is fluidically connected to the core duct branch 70 downstream from the core outlet 50 to receive core flow from the core duct 56. Although the control ducts 86, 88 are shown in FIG. 1 as receiving core flow from the core duct 56, the control ducts 86, 88 may be mounted on the airframe 22 to receive core flow from any component of the engine 24 and/or the lift system 26 without departing from the scope of the present invention. Additionally, the core ducts 86, 88 may receive core flow from any portion of the core duct 56 without departing from the scope of the present invention.

The attitude control ducts 86, 88 are each positioned with respect to the airframe 22 to direct core flow in a direction controlling an attitude of the aircraft 20. Although the ducts 86, 88 may be positioned with respect to the airframe 22 in any suitable fashion to direct core flow in a direction controlling an attitude of the aircraft 20, in one embodiment the ducts 86, 88 are positioned with respect to the airframe as shown in FIG. 1. Specifically, the duct 86 extends from the upstream end 90 to a downstream end 94 having a valve 96. Similarly, the duct 88 extends from the upstream end 92 to a downstream end 98 having a valve 100. The downstream ends 94, 98 are positioned with respect to the airframe 22 to direct core flow in a direction controlling an attitude of the aircraft 20. The valves 96, 100 are operable to selectively allow core flow to exit the respective downstream ends 94, 98 for controlling an attitude of the aircraft 20. As shown in FIG. 1, the control ducts 86, 88 each extend within a respective wing 102, 104 of the aircraft 20 and the downstream ends 94, 98 are positioned with respect to the airframe 22 to direct core flow in a direction controlling orientation of the aircraft 20 about the roll axis 82. However, the control ducts 86, 88 may be positioned anywhere with respect to the airframe 22 to direct core flow in a direction controlling orientation of the aircraft 20 about any axis without departing from the scope of the present invention. For example, the control ducts 86, 88 may be positioned with respect to the airframe 22 to direct core flow in a direction controlling orientation of the aircraft 20 about the pitch axis 80 and/or a yaw axis 106 (FIG. 2). Additionally, although two control ducts 86, 88 and two valves 96, 100 are shown in FIG. 1, any number of control ducts supplying any number of valves may be used to direct core flow in any number of directions to control an attitude of the aircraft 20 without departing from the scope of the present invention. Any direction the attitude control ducts 86, 88 direct core flow may be referred to herein as a first, a second, and/or a third direction. In this embodiment, the attitude control jets account for approximately ten percent of the available core or about 330 lbf thrust total.

Although other valves may be used without departing from the scope of the present invention, in one embodiment the valves 96, 100 are selected from a group of valves consisting of Boeing JSF (X-32B) styled roll valves, roll ducts and shut-off valves that are scaled from the actual JSF Attitude Control System (ACS), and any combination thereof. For example, in one embodiment the valves 96, 100 are ACS valves commercially available from Rolls-Royce of Indianapolis, Ind. Although the attitude control ducts 86, 88 direct core flow in a direction controlling an attitude of the aircraft 20, the attitude control ducts may direct bypass flow in a direction controlling an attitude of the aircraft without departing from the scope of the present invention.

In one embodiment, the lift system 26 includes an augmentor 108 operatively connected to the core duct 56 to heat the core flow received from the engine 24, and more specifically the core outlet 50, before supplying the core flow to the lift fan 78. The augmentor 108 boosts the heat within the core flow received from the engine 24 to increase the energy driving the lift fan. Boosting the heat within the core flow received from the engine may be particularly useful during operational conditions of the aircraft wherein a large amount of lift is desired from the lift fan 78. In this embodiment, the augmentor is intended to be used when operating typically at or above eighty percent of the vehicle take-off gross weight rating or when operating at non-standard altitude and temperature conditions (i.e., altitudes above sea level and temperatures above 59° F. Although other augmentors may be used without departing from the scope of the present invention (e.g, such as the remote burners developed for the Boeing X-32 Joint Strike Fighter), in one embodiment the augmentor 108 is a combustion chamber, wherein a fuel is mixed with the core flow and the mixture is ignited to heat it. In one embodiment, the augmentor 108 is a Remote Augmented Lift System Burner (RALS Burner) that is commercially available from General Electric Company.

Although the augmentor 108 shown in FIG. 1 is operably connected to the core duct 56 downstream from the attitude control ducts 86, 88, the augmentor 108 may be operably connected to the core duct upstream from the control ducts to heat the core flow supplied to the control ducts without departing from the scope of the present invention.

Although the bypass duct 58 may be aligned with the engine compartment 28 and the engine 24 in any suitable fashion to receive bypass flow from the engine, in one embodiment the bypass duct 58 is aligned with the engine compartment 28 and the engine 24 as shown in FIG. 1. Specifically, an upstream end (generally designated by 110) of the bypass duct 58 is positioned downstream from the bypass outlet 54 to receive bypass flow from the bypass outlet. The bypass duct 58 is defined by the exhaust 42 of the engine 24, including the nozzle 48, and therefore receives bypass flow exiting the bypass outlet 54. The arrangement shown in FIG. 1 allows the bypass duct 56/exhaust 42 to receive bypass flow from the engine 24 without mixing the received bypass flow with core flow. Specifically, when the diverter 66 is in the closed position the diverter directs generally all of the core flow exiting the core outlet 50 into the core duct 56, and therefore the bypass duct 58/exhaust 42 generally only receives bypass flow exiting the bypass outlet 54.

In an alternative embodiment, all or a portion of the bypass duct 58 is a separate component from the exhaust 42 of the engine. When the bypass duct 58 is a separate component, it is aligned with the bypass outlet 54 to receive all and/or a portion of the bypass flow exiting the bypass outlet. In such an embodiment, the bypass duct 58 receives bypass flow from the engine 24 without mixing the bypass flow with core flow from the engine, regardless of whether the diverter 66 (if incorporated into the lift system 26) allows any core flow into the exhaust 42 of the engine. In an embodiment wherein the bypass outlet 54 and the core outlet 50 are segregated along generally the entire length of the exhaust 42 of the engine 24, the bypass duct 58 will receive bypass flow from the engine without mixing the received bypass flow with core flow even when the bypass duct is defined by the exhaust of the engine and/or any core flow passes the diverter 66 (if incorporated). In an embodiment wherein the bypass duct 58 is defined by the exhaust 42 of the engine 24, and the bypass outlet 54 and the core outlet 50 are segregated along generally the entire length of the exhaust, the bypass duct may be movable with respect to the core outlet to direct bypass flow exiting the bypass duct in a different direction than core flow exiting the core outlet.

Although the bypass duct 58 may be positioned with respect to the airframe 22 in any suitable fashion to direct bypass flow received from the engine 24 in a direction generating lift for the aircraft 20, in one embodiment the bypass duct 58 is positioned with respect to the airframe as shown in FIG. 1. Specifically, as described above the bypass duct 58 is defined by the exhaust 42, which is positioned adjacent a rearward end (generally designated by 112) of the aircraft 20. The bypass duct 58/exhaust 42 has a downstream end (the nozzle 48 in the embodiment shown in FIG. 1) positioned with respect to the airframe 22 to direct bypass flow in a direction (e.g., the direction 62 shown in FIG. 2) generating lift for the aircraft 20. The nozzle 48 is a vectoring nozzle, such that when the bypass duct 58 is defined by the exhaust 42, a direction of gas exiting the nozzle can be selected to generate lift for the aircraft 20 and/or propel the aircraft forward. In one embodiment, the nozzle 48 is capable of vectoring through an arc of about 110°. Although other nozzles may be used without departing from the scope of the present invention, in one embodiment the nozzle 48 is an Advanced Deflector Exhaust Nozzle (ADEN) type available from General Electric. In this embodiment, the nozzle 48 includes a splay flap 114, which can be used for both partial thrust vectoring and exhaust exit area control purposes.

As described above, in an alternative embodiment all or a portion the bypass duct 58 may be a separate component from the engine exhaust 42. In such an embodiment, the bypass duct 58 has a downstream end (not shown) separate from the exhaust that is positioned with respect to the airframe to direct bypass flow in a direction (e.g., the direction 62 shown in FIG. 2) generating lift for the aircraft 20. In any of the embodiments described herein, the downstream end of the bypass duct 58 may or may not include a nozzle (e.g., nozzle 48).

Because the bypass duct 58 receives bypass flow from the engine 24 without mixing the received core flow with bypass flow, the bypass flow directed by the bypass duct 54 in a direction generating lift for the aircraft 20 is segregated from bypass flow. By directing bypass flow segregated from core flow in the direction generating lift, the present invention reduces a temperature at which gas is directed at a surface for takeoff and/or landing of the aircraft 20. Accordingly, the present invention may facilitate reducing damage to surfaces the aircraft 20 takes off from and/or lands on. Additionally, the present invention may also allow the aircraft 20 to take off from and/or land on surfaces, and/or operate in environments, not possible with higher temperatures. Although other temperatures are within the scope of the present invention, in one embodiment the air moved by the lift fan 78 to generate lift for the aircraft 20 exits an outlet 84 of the lift fan 78 at a temperature of between about 250° F. and about 500° F.

Although the downstream end (nozzle 48 as shown in FIGS. 1 and 2) of the bypass duct 58 is shown herein as being mounted on the airframe 22 adjacent the rearward end 112 of the aircraft 20, the end may be mounted anywhere on the airframe without departing from the scope of the present invention. Similarly, although the downstream end of the bypass duct 58 is shown in FIG. 2 as directing bypass flow in the direction 62 extending generally perpendicular to a pitch axis 80 and a roll axis 82 of the aircraft 20, the bypass duct downstream end may direct bypass flow in any direction generating lift for the aircraft without departing from the scope of the present invention. Any direction the bypass duct 54 directs bypass flow may be referred to herein as a first, a second, and/or a third direction.

The above-described aircraft, airframe, lift system and method are cost-effective and reliable for generating lift. Specifically, by integrating the lift system of the present invention with a gas turbine engine having a bypass ratio of at least about four to about one, the present invention may decrease specific fuel consumption of VTOL aircraft during cruise portions of flight, thereby decreasing a cost to operate the VTOL aircraft. Additionally, by using a lift fan to generate lift and by directing bypass flow segregated from core flow to generate lift, the present invention reduces a temperature at which gas is directed at a surface for take off and/or landing of the aircraft 20. Accordingly, the present invention may facilitate reducing damage to surfaces the aircraft 20 takes-off from and/or lands on. The present invention may also allow the aircraft 20 to take off from and/or land on surfaces, and/or operate in environments, not possible with higher temperatures. Furthermore, by driving the lift fan with core flow from the engine 24, the present invention may not disrupt the exhaust flowfield within the engine and thereby may facilitate providing a more fuel efficient engine than systems having a shaft-driven lift fan.

Although the invention is herein described and illustrated in association with an aircraft, it should be understood that the present invention is generally applicable to generating lift for any vehicle. Accordingly, practice of the present invention is not limited to aircraft, nor is practice of the present invention limited any aircraft described and/or illustrated herein.

Exemplary embodiments of lift systems, airframes, aircraft, and methods are described above in detail. The methods, systems, airframes, and aircraft are not limited to the specific embodiments described herein, but rather, components of each system, airframe, and aircraft may be utilized independently and separately from other components described herein, and steps of each method may be utilized independently and separately from other steps described herein. Each lift system, airframe, and aircraft component can also be used in combination with other lift system, airframe, and/or aircraft components. Additionally, each method step can also be used in combination with other method steps described herein.

When introducing elements of the present invention or the preferred embodiment(s) thereof, the articles "a", "an", "the" and "said" are intended to mean that there are one or more of the elements. The term "plurality" is intended to mean there are two or more of the corresponding elements. The term "multiplicity" is intended to mean that there are three or more of the corresponding elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A vehicle comprising:
    a frame having an engine compartment for mounting a gas turbine engine having a combustor, a core flow heated by the combustor and a bypass flow which bypasses the combustor;
    a core duct mounted on said frame and aligned with said engine compartment to receive core flow from the engine, an end of said core duct downstream from said engine compartment being positioned with respect to said frame to direct said core flow received from the engine in a first direction to drive a lift fan without mixing said core flow received from the engine with bypass flow; and
    a bypass duct mounted on said frame and aligned with said engine compartment to receive bypass flow from the engine, an end of said bypass duct downstream from said engine compartment being positioned with respect to said frame to direct said bypass flow received from the engine in a second direction to generate lift for the vehicle without mixing said bypass flow with core flow.

2. A vehicle in accordance with claim 1 further comprising a diverter fluidically connected to said core duct and positioned with respect to said engine compartment and said core duct to direct core flow from the engine to said core duct.

3. A vehicle in accordance with claim 1 further comprising an attitude control duct mounted on said frame to receive core flow from the engine, an end of said attitude control duct downstream from said engine compartment being positioned with respect to said frame to direct said core flow received from the engine in a third direction to control an attitude of said vehicle.

4. A vehicle in accordance with claim 1 further comprising an augmentor operably connected to said core duct to heat said core flow received from the engine downstream from the combustor of the engine.

5. A vehicle in accordance with claim 1 wherein said end of said bypass duct comprises a nozzle for directing said bypass flow received from the engine in the second direction.

6. A vehicle in accordance with claim 5 wherein said nozzle is a vectoring nozzle capable of selectively vectoring through an arc of about 110°.

7. An aircraft comprising:
    an airframe;
    a gas turbine engine mounted on the airframe comprising a combustor, said gas turbine engine generating a core flow flowing through the combustor and a bypass flow bypassing the combustor;
    a core duct mounted on the airframe to receive core flow from the engine, an end of the core duct downstream from the engine being positioned with respect to the airframe to direct the core flow received from the engine in a first direction to generate lift for the vehicle without mixing the core flow received from the engine with bypass flow; and
    a bypass duct mounted on the airframe to receive bypass flow from the engine, an end of the bypass duct downstream from the engine being positioned with respect to the airframe to direct the bypass flow received from the engine in a second direction to generate lift for the vehicle without mixing the bypass flow received from the engine with core flow.

8. An aircraft in accordance with claim 7 further comprising a diverter fluidically connected to the core duct and positioned between the engine and the core duct to direct core flow from the engine to the core duct.

9. An aircraft in accordance with claim 7 further comprising an augmentor operably connected to the core duct to heat the core flow received from the engine downstream from the combustor of the engine.

10. aircraft in accordance with claim 7 wherein the end of the bypass duct comprises a nozzle for directing the bypass flow received from the engine in the second direction.

11. An aircraft in accordance with claim 10 wherein the gas turbine engine has an exhaust comprising the nozzle.

12. An aircraft in accordance with claim 11 wherein the nozzle is a vectoring nozzle capable of selectively vectoring through an arc of about 110°.

13. An aircraft in accordance with claim 7 further comprising an attitude control duct mounted on the airframe to receive core flow from the engine, an end of the attitude control duct downstream from the engine being positioned with respect to the airframe to direct the core flow received from the engine in a third direction to control at least one of a pitch, a yaw, and a roll of the aircraft.

14. An aircraft in accordance with claim 7 further comprising a lift fan for generating lift when driven by the core flow received from the engine and directed in the second direction by the core duct.

15. An aircraft comprising:

an airframe;

a gas turbine engine mounted on the airframe comprising a combustor, said gas turbine engine generating a core flow directed through the combustor and a bypass flow bypassing the combustor;

a core duct mounted on the airframe to receive core flow from the engine, an end of the core duct downstream from the engine being positioned with respect to the airframe to direct the core flow received from the engine in a first direction to drive a lift fan, wherein gas exiting the lift fan has a temperature of less than about 800° F.; and a bypass duct mounted on the airframe to receive bypass flow from the engine, an end of the bypass duct downstream from the engine being positioned with respect to the airframe to direct the bypass flow received from the engine in a second direction to generate lift for the vehicle, wherein the bypass flow directed in the second direction exits the bypass duct at a temperature of less than about 800° F.

16. An aircraft in accordance with claim 15 wherein the lift system comprises an augmentor operatively connected to the core duct to heat the core flow received from the engine.

17. An aircraft in accordance with claim 15 wherein the end of the bypass duct comprises a vectoring nozzle for selectively directing the core flow received from the engine through an arc of about 110°.

* * * * *